United States Patent
Teubner

(10) Patent No.: US 10,301,038 B2
(45) Date of Patent: May 28, 2019

(54) SYSTEM AND METHOD FOR DETECTING MECHANICAL FAILURE IN THE HIGH LIFT SYSTEM OF AN AIRCRAFT

(71) Applicant: Airbus Operations GmbH, Hamburg (DE)

(72) Inventor: Tobias Teubner, Hamburg (DE)

(73) Assignee: Airbus Operations GmbH (DE)

( * ) Notice: Subject to any disclaimer, the term of this patent is extended or adjusted under 35 U.S.C. 154(b) by 93 days.

(21) Appl. No.: 15/365,141

(22) Filed: Nov. 30, 2016

(65) Prior Publication Data
US 2017/0158348 A1  Jun. 8, 2017

(30) Foreign Application Priority Data

Dec. 3, 2015 (EP) ..................... 15197722

(51) Int. Cl.
| | |
|---|---|
| *B64D 45/00* | (2006.01) |
| *B64C 9/02* | (2006.01) |
| *G01H 1/00* | (2006.01) |
| *B64C 9/16* | (2006.01) |
| *B64C 9/22* | (2006.01) |

(Continued)

(52) U.S. Cl.
CPC ............... *B64D 45/00* (2013.01); *B64C 9/02* (2013.01); *B64C 9/16* (2013.01); *B64C 9/22* (2013.01); *B64F 5/60* (2017.01); *G01H 1/00* (2013.01); *G05B 23/0235* (2013.01); *B64D 2045/0085* (2013.01)

(58) Field of Classification Search
CPC ...................................................... B64D 45/00
See application file for complete search history.

(56) References Cited

U.S. PATENT DOCUMENTS 4,366,544 A * 12/1982 Shima .................... G01H 1/003
340/683
4,706,902 A   11/1987 Destuynder et al.
(Continued)

FOREIGN PATENT DOCUMENTS

EP  2026158 A2  2/2009

OTHER PUBLICATIONS

EP Search Report (15197722.0) dated Apr. 13, 2016.

*Primary Examiner* — Hussein Elchanti
*Assistant Examiner* — Michael A Berns
(74) *Attorney, Agent, or Firm* — Lerner, David, Littenberg, Krumholz & Mentlik, LLP

(57) ABSTRACT

An aircraft includes a fuselage, each wing with a movable flap element arranged on the wing, having a sensor element providing a sensor signal corresponding to vibrations on the flap element, and being movable between a retracted and an extended positions, drive means having a movable driven output connected by an actuation assembly with each of the flap element and configured such that a movement of the output effects a movement of each of the flap element between the extended and retracted positions. A control unit is adapted to compare for each sensor element during operation of an excitation means the amplitude of the vibrations in the frequency interval detected by that sensor element with a predetermined threshold of that sensor element and to provide a failure signal when for at least one sensor signal the amplitude is below the threshold of that at least one sensor signal.

11 Claims, 4 Drawing Sheets

(51) Int. Cl.
*G05B 23/02* (2006.01)
*B64F 5/60* (2017.01)

(56) References Cited

U.S. PATENT DOCUMENTS

| | | | |
|---|---|---|---|
| 8,281,659 B2* | 10/2012 | Napolitano | G01M 7/022 |
| | | | 73/579 |
| 9,483,057 B2* | 11/2016 | Dorr | G05B 23/0235 |
| 2013/0158891 A1* | 6/2013 | Niepokolczycki | G01H 1/00 |
| | | | 702/33 |
| 2013/0345908 A1 | 12/2013 | Dorr et al. | |
| 2014/0336865 A1 | 11/2014 | Catt et al. | |
| 2016/0355278 A1* | 12/2016 | Goodman | B64D 45/00 |

\* cited by examiner

US 10,301,038 B2

SYSTEM AND METHOD FOR DETECTING MECHANICAL FAILURE IN THE HIGH LIFT SYSTEM OF AN AIRCRAFT

FIELD OF THE INVENTION

The present invention relates to an aircraft comprising a fuselage and first and second wings extending away from the fuselage wherein the wings are provided with movable flap elements as well as a method operating the flap elements on such aircraft.

BACKGROUND OF THE INVENTION

In modern aircrafts the actuation system for the trailing edge flaps on the wings comprises a central drive unit or power control unit (PCU) with at least one drive motor, the unit being arranged in the fuselage in the center between the wings. Further, an assembly of shafts and gear boxes is arranged along the wing so as to transfer rotary power to drive stations also arranged along the wing at which stations the rotary power is converted into a translational movement of the flaps.

The output of the PCU is configured such that during operation the rotational speed at the output as well as of the shafts in the actuation assembly is rather high. In the drive stations transmission assemblies are employed which reduce the rotational speed so as to obtain the required torque at the output of the drive stations for adjusting the position of the flaps.

The advantage of initially using high rotational speeds is that the shafts and the gear boxes for transmitting the rotary power from the PCU to the drive stations do not need to be designed very rigid as the torque being transmitted is rather low which in turn does not require heavy shaft and gear box arrangements so that the entire weight of the actuation assembly is kept low.

In the afore-mentioned actuation assemblies it may occur that a transmission shaft between the output of the PCU and the drive stations breaks. This has the effect that drive stations beyond the shaft which is broken, are no longer supplied with rotary power. In order to detect such a failure, it is known from the prior art to provide a sensor at the right hand and left hand distal end of the entire shaft and gear box assembly remote from the PCU, the sensors being capable of detecting the angular position of the shafts and thus the flap position. If the sensors differs in the position more than a certain threshold this indicates a failure in the actuation system.

However, it is also possible that the transmission assembly in a drive station breaks so that this drive station no longer contributes any force for adjusting the position the flap connected to this drive station. In addition, it is also conceivable that a part of a strut assembly coupling the output of a drive station with the respective flap to move the latter, breaks. Also in this case the respective drive station can no longer contribute any force to adjust or maintain the position of the flap. In order to monitor whether one of the latter two types of failures occurred further prior art detection methods are known.

A first method is the so-called flap skew measurement. Here, position sensors are provided at each hinge point at which a flap is pivotably supported on the wing, and a difference in the position may indicate a failure in the actuation system and in particular in the part between the gear box assembly and the flap itself, namely in the drive station and in the strut assembly. However, the flaps may have a sufficient level of stiffness such that the loads applied on the flaps in flight do not lead to a deformation of the flaps that is large enough to be detected by the sensors. Furthermore, when the aircraft is on ground, significant forces may not act on the flaps such that the afore-mentioned stiffness prevents a difference in the detected positions at the hinge points, and this method would therefore not be capable of detecting failures when the aircraft is on ground.

In a further method load sensors are arranged on the struts connecting the output of a drive station and the respective flap such that the load applied to the struts can be measured during holding and positioning of the flap. Furthermore, the loads are measured both in-flight and on ground. The difference between these values is determined and compared with a predetermined threshold value. Based on this comparison it can be decided whether a failure is present or not. However, this method requires complex sensor assemblies.

BRIEF SUMMARY OF THE INVENTION

An aspect of the present invention may provide a system and a method to more reliably detect mechanical failures in the flap actuation system of an aircraft and in particular in the drive stations and the elements coupling the drive stations and the flap.

According to a first aspect of the present invention, an aircraft comprises
 a fuselage
 a first and a second wing extending away from the fuselage on opposite sides thereof,
 each wing being provided with at least one movable flap element arranged on the wing and being movable relative to the wing between a retracted position and an extended position,
 drive means having a movable driven output,
 an actuation assembly connecting the output of the drive means with each of the at least one flap element on the wings, the actuation assembly being configured such that a movement of the output of the drive means effects a movement of each of the at least one flap element between the extended and the retracted positions,
 wherein each of the flap elements is provided with a sensor element fixedly mounted on it,
 wherein each sensor element is capable of providing a sensor signal which corresponds to the vibrations at the position of the sensor element (51) on the flap element,
 excitation means capable of exciting vibrations of the output, the vibrations being in a defined frequency interval, and
 a control unit connected with the excitation means and each sensor element,
 wherein the control unit is adapted to compare for each sensor element during operation of the excitation means the amplitude of the vibrations in the defined frequency interval detected by that sensor element with a predetermined threshold of that sensor element and to provide a failure signal when for at least one sensor signal the amplitude is below the threshold of that at least one sensor signal.

Thus, according to an aspect of the present invention the preferably pivotably mounted flap elements on the wings, and in particular the trailing edge flaps, are moved between their retracted and extended positions by drive means, such as drive units comprising one or more electric or hydraulic motors, which are coupled with the flap elements via an actuation assembly which will be described in more detail below. Even though in the following description the present invention is described in such a manner that the flaps are arranged at the trailing edge of the wings, the invention is not limited to the application of those types of flaps. Instead the term "flaps" in the sense of the present invention is to be construed broadly so as to cover also other types of moveable control surfaces on wings such as slats, droop noses etc.

Further, excitation means are provided which are capable of exciting vibrations of the output of the drive means, these vibrations being in a defined frequency interval. In this regard, it has to be noted that the term "vibrations" in the sense of the present invention includes in particular solid-borne sound.

Moreover, sensor elements are fixedly mounted on the flap elements, in particular at those positions where the wing is attached to parts of the actuation assembly, and the sensor elements are connected to a control unit which may also be connected to the drive means so that the control unit may additionally be capable of controlling the drive means. The sensor elements are configured such that they are capable of providing a sensor signal that corresponds to the vibrations, especially in the form of solid-borne sound, at the position of the sensor, these vibrations being in the frequency interval of the vibrations generated at the output of the drive means by the excitation means. Thus, the sensor elements detect vibrations of the flap element at the position of the sensor elements and provide a signal which represents the vibrations in such a manner that the signal reflects the deflection or displacement as a function of time at the respective position, and hence allows to determine the amplitude of these vibrations.

When the flap elements are coupled to the excitation means via the actuation assembly and there is no failure within the actuation assembly such as a defective shaft or gear box element, the flap element is rigidly coupled to the excitation means so that vibrations generated during operation of the excitation means and having frequencies in the defined interval are transmitted to the flap elements. These vibrations are detected by the sensor elements and due to specific frequencies can be identified as those being generated by the excitation means at the output of the drive means.

However, if there is one of the afore-mentioned failures in the connection between one of the flap elements and the drive unit formed by the actuation assembly, then this rigid connection between that flap element and the excitation means is interrupted, and the amplitude of the specific vibrations generated within the flap element due the operation of the excitation means is significantly reduced. This reduction can be detected by means of the sensor elements. In particular, according to an embodiment of the present invention, the control unit is adapted in such a manner that it compares the amplitude of the defined frequency band in the sensor signals with predetermined thresholds stored in the control unit for the respective sensor elements, and if the amplitude of one of the sensor signals is below the corresponding threshold for that sensor element which provides this signal with a low amplitude, a failure signal is generated by the control unit. This failure signal may already include information as to which sensor element has detected vibrations with a small amplitude so that this failure signal allows to determine the connection from which flap element is defective.

In this regard, it is possible that the control unit is adapted to analyse the frequency spectrum of the sensor signals so as to determine the amplitude in the defined frequency interval. However, it is also conceivable that each sensor element is combined with a digital signal processor (DSP) which analyses the frequency spectrum, so that a signal is already sent to the control unit which represents the amplitude in the defined frequency interval. Here, it is also possible that these processors form part of the control unit and compares the determined amplitude with the respective threshold.

The concept of the present invention to detect the amplitude of vibrations at the flap elements generated by excitation means at the end of the drive train adjacent to the drive means has the advantage that these vibration amplitudes do not depend on the level of loads applied to the flap elements and the flaps' stiffness design.

Furthermore, besides the detection of failures in the drive train between the drive means and the flap elements, this concept also allows to monitor the mechanical status of the actuation assembly. For example an increase of the amplitude of the vibrations especially in a certain frequency region may indicate that wear occurred within the actuation assembly, e.g. bearings for rotating parts in the actuation assembly are worn out. Further, an increase of the amplitude of vibrations in certain frequency regions may also be a hint that a lack of lubricant has occurred.

In a preferred embodiment, the excitation means are formed by the drive means and wherein for each sensor element the amplitude of the vibrations in the frequency interval is compared with the predetermined threshold during operation of the drive means. Thus, the integrity of the entire drive train for moving the flaps is monitored during adjustment of the latter which simplifies the monitoring process and does not require additional devices. In this case it is utilized that the motors employed in the drive means generate vibrations or solid-borne sound in a specific frequency interval and the sensor elements can detect these frequencies.

However, it is also conceivable to employ as excitation means a separate excitation drive such as a solid-borne sound generator which is installed at and engages with the output of the drive means. This allows for a precise adjustment of the frequency of the vibrations being generated, so that these vibrations and efficiency of the transmission thereof can be better analysed.

Furthermore, it is preferred that each of the flap elements comprises a connection element fixedly coupled to the flap element, the actuation assembly being connected to the connection element. Furthermore, the sensor elements of each flap element are fixed to the connection elements on that flap element. In such an arrangement the sensor elements are located at that position where the vibrations transmitted through the actuation assembly are introduced into the flap elements. This allows for an effective detection of those vibrations of interest which are generated by the excitation means, e.g. in the form of the drive means during its operation and are transferred via the actuation assembly with the shaft elements to the flap elements.

In a preferred embodiment the drive unit is arranged in the fuselage of the aircraft between the first and the second wing and the drive unit comprises first and second rotatably driven outputs. Further, in this embodiment the actuation assembly comprises a first drive station and a first shaft assembly, the first drive station having a rotatable input element and an output element coupled to the input element in such a manner that rotation of the input element results in a rotation of the output element. The first drive station is arranged on the first wing and the first shaft assembly connects the first output with the input element of the first drive station. The output element of the first drive station is coupled with the at least one flap element on the first wing.

Moreover, in this embodiment the actuation assembly further comprises a second drive station and a second shaft assembly, the second drive station having a rotatable input element and an output element coupled to the input element in such a manner that rotation of the input element results in a rotation of the output element. The second drive station is arranged on the second wing and the second shaft assembly connects the second output with the input element of the second drive station. Finally, the output element of the second drive station is coupled with the at least one flap element on the second wing.

In this preferred embodiment the actuation assembly comprises a first section arranged in the first wing and including a shaft assembly which transmits rotary power from the first output of the drive unit to the input element of the drive station. The shaft assembly may comprise a plurality of shafts rotatably supported in the wing which shafts are interconnected by gear box elements or the like. The drive station comprises a rotatably driven output element which is preferably coupled with the flap element on the first wing via a strut member. In this case, the strut member connects the output element of the drive station and the connection element of the at least one flap element.

The second section of the actuation assembly is designed symmetrically to the first section and comprises a second shaft assembly transmitting rotary power from the second output of the drive unit along the second wing to the second drive station the output element of which is preferably coupled to the flap element on the second wing via a strut member.

Here, it should be noted that even though for each wing only one drive station is explicitly described, it will be appreciated that several drive stations can be arranged in series in each wing the input elements of the drive stations being coupled to one or more flap elements. In such a configuration the shaft assembly is configured such that it comprises shaft elements which interconnect the input elements of adjacent drive stations so that rotary power from the respective output of the drive unit is transmitted to the input elements of each drive station.

Furthermore, if a flap element is connected to two adjacent drive stations, preferably by separate connection elements which are fixedly coupled to the flap element, each connection element can be provided with a sensor element so that it is possible to independently monitor whether the first and the second drive station and the elements of the shaft assembly between the drive stations are working properly.

Preferably, the drive stations have a gear assembly coupling the input element and the output element and the gear assembly is configured such that when the input element is rotatably driven by the shaft assembly with a first rotational speed the output element rotates with a second rotational speed that is lower than the first rotational speed, preferably by a factor larger than 300.

Such an arrangement allows for a high rotational speed of the shaft elements in the shaft assembly during operation of the drive unit which speed is strongly reduced in the gear assemblies increasing the maximum torque provided at the output element of the drive stations. This in turn means that the maximum torque transmitted along the shaft assembly is kept rather low so that the maximum loads on the shaft elements are low as well and the stability requirements for the shaft elements do not lead to a high weight of these elements.

Furthermore, another aspect of the invention includes a method which results in those advantages already discussed with respect to design of an aircraft according to an embodiment of the present invention.

BRIEF DESCRIPTION OF THE DRAWINGS

In the following preferred embodiments of the present invention are described with reference to the drawings.

DETAILED DESCRIPTION

Figure 1:
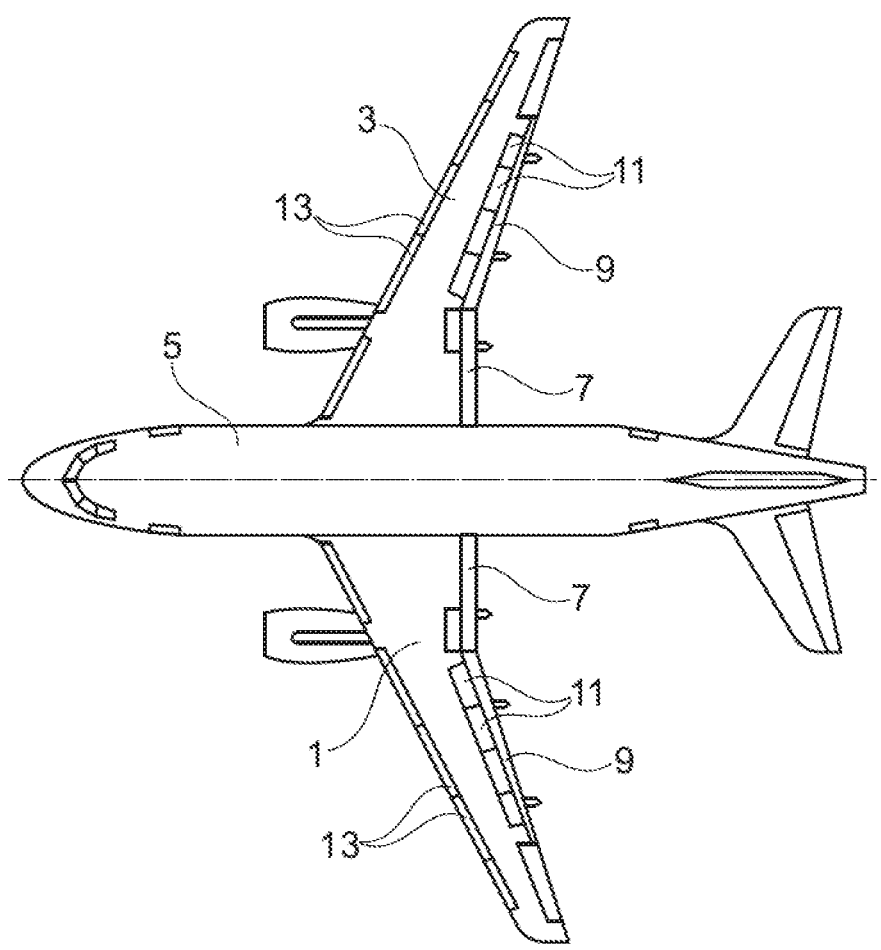
FIG. 1 is a top view of a preferred embodiment of an aircraft according to the present invention.
Figure 2:
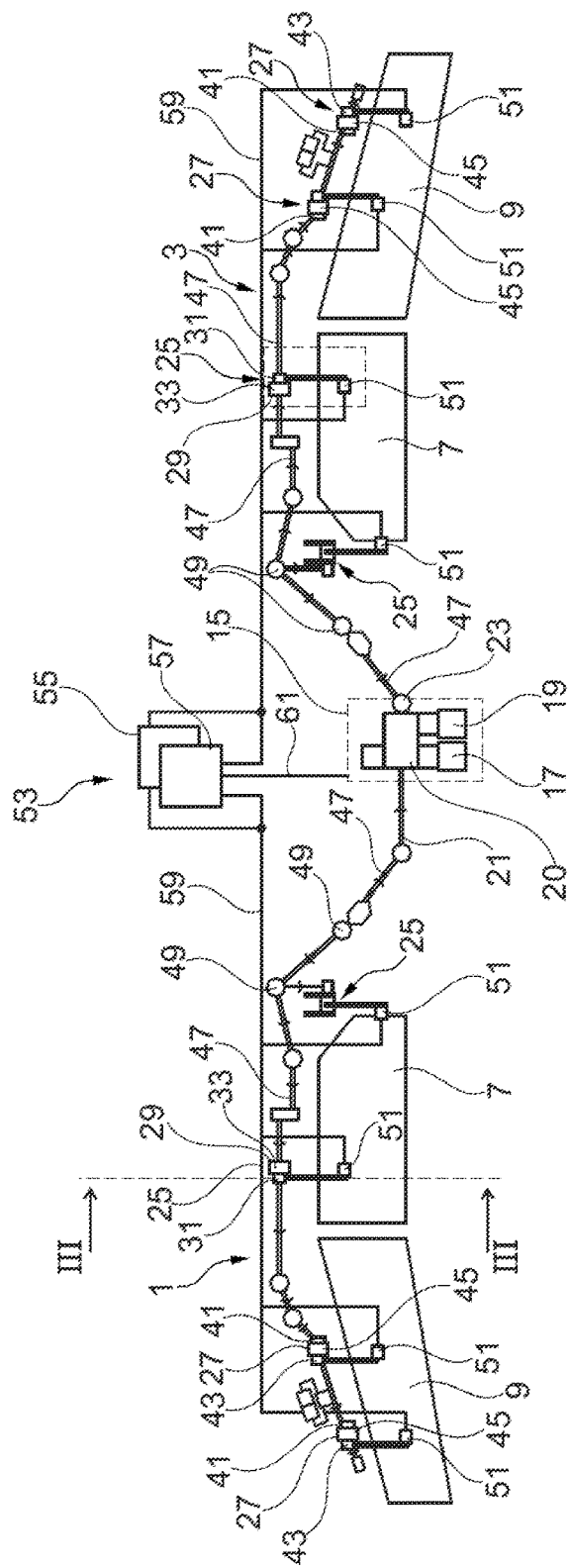
FIG. 2 is a top view of the trailing edge flap drive system of the aircraft of FIG. 1.

As shown in FIGS. 1 and 2 in the preferred embodiment of an aircraft according to the present invention the first and second or left and right wings 1, 3 are arranged opposite to each other on the fuselage 5 and are provided with trailing edge flaps 7, 9. In particular, both the left and the right wing 1, 3 are provided with an inner flap 7 and an outer flap 9, the inner flaps 7 being arranged close to the fuselage 5 whereas the outer flaps 9 are located remote from the fuselage 5 at that side of the inner flaps 7 opposite the fuselage 5. In this regard, it should be noted that it is also conceivable that only one flap per wing is employed or that more than two flaps are used on each wing.

Even though in the preferred embodiments the present invention is applied to the drive train for flaps that are arranged at the trailing edge of the wings, the invention is not limited to the application of those flaps. Instead the term "flaps" in the sense of the present invention is to be construed broadly so as to cover also other types of moveable control surfaces on wings such as slats, droop noses etc.

Figure 3:
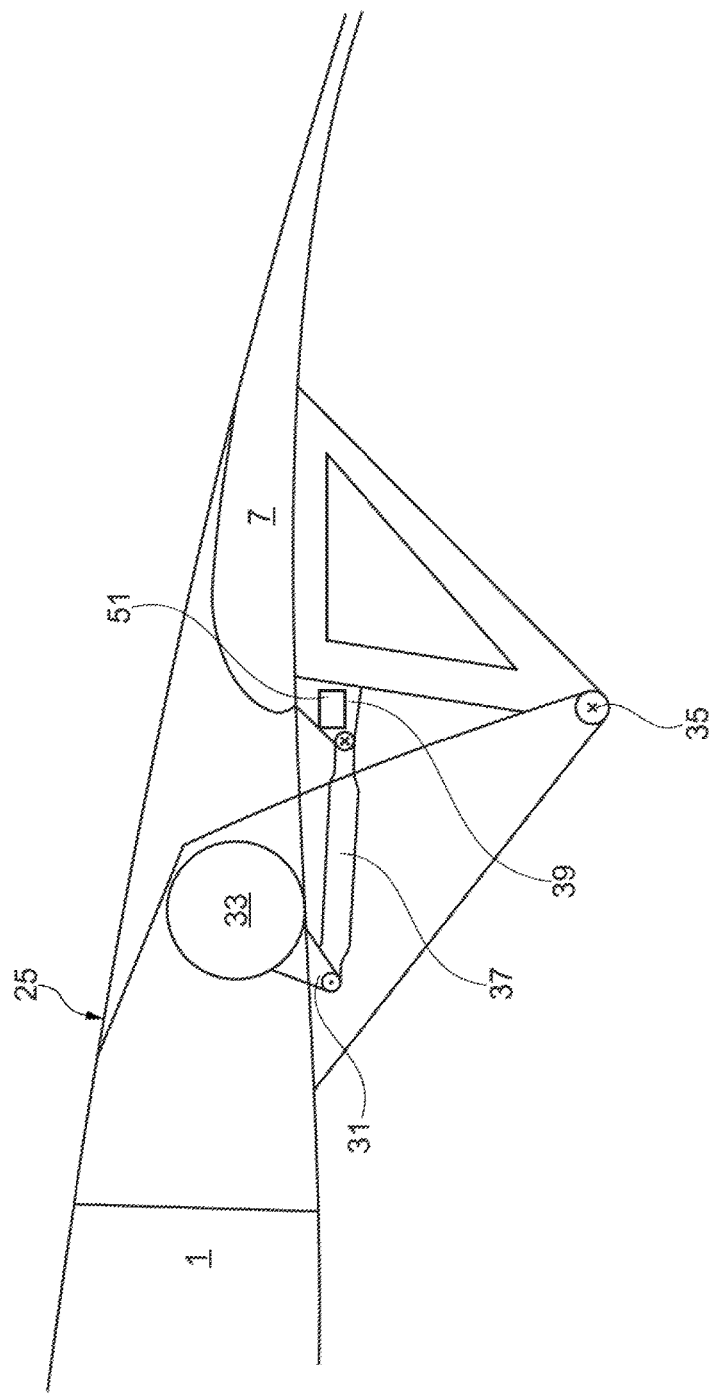
FIG. 3 is cross-sectional view along the line III-III in FIG. 2 showing the connection between one of the flap elements and the wing portion.

The flaps 7, 9 are movable relative to the wing between a retracted position shown in FIGS. 1 and 3 and an extended position (not shown) wherein in the extended position the lift generated by the wings 1, 3 is increased.

In addition to the flaps 7, 9 the wings 1, 3 are provided with adjustable spoilers 11 and leading edge slats 13, and such an arrangement of flaps 7, 9, spoilers 11 and slats 13 is known from the prior art.

In order to move the flaps 7, 9 between the retracted and the extended positions drive means in the form of a drive unit 15 are arranged in the fuselage 5 at a position between the wings 1, 3. The drive unit 15 comprises a first and a second motor 17, 19 which can be hydraulic and/or electric motors. The first and the second motors 17, 19 are coupled to a differential gearbox 20 which has a first output 21 and a second output 23 so that the first and the second outputs 21, 23 are rotationally driven by the first and second motor 17, 19. When one of the motors 17, 19 fails the remaining operating motor can still drive both outputs 21, 23.

As can be seen in FIG. 2 an actuation assembly is provided both in the left and the right wings 1, 3 so that the actuation assembly has a first section and a second section. The first section of the actuation assembly in the left wing 1 comprises four drive stations, namely two inner drive stations 25 and two outer drive stations 27. The inner drive stations 25 each comprise an input element 29 and an output element 31, the output element 31 being coupled to the input element 29 by a gear assembly 33 which is configured such that when the input element 29 is rotatably driven by the shaft assembly with a first rotational speed the output element 31 rotates with a second rotational speed that is lower than the first rotational speed. In particular, the rotational speed is reduced by a factor larger than 300.

As shown in FIG. 3 the inner flap 7 of the left wing 1 is pivotably mounted on the left wing 1 wherein the inner flap 7 may pivot with respect to a pivot axis 35 between the retracted position (shown in FIG. 3) and the extended position (not shown). Further, a strut element 37 connects the rotatably driven output element 31 of the inner drive station 25 with a connection element 39 fixedly coupled to the inner flap 7.

The outer drive stations 27 also comprise an input element 41 and an output element 43 and are provided with a gear assembly 45 which reduces the rotational speed at the output element 43 compared to the input element 41 when the latter is rotationally driven. Further, while FIG. 3 shows the coupling between an inner flap 7 and one of the inner drive stations 25, the coupling between the other drive stations 25, 27 and the respective flaps 7, 9 are configured in the same manner, i.e. the flaps 7, 9 are pivotably mounted on the wing 1 and the rotatably driven output element 31, 43 is connected to a connection element 39 on the respective flap 7, 9 via a strut element 37. However, it should be noted that the present invention can also be applied to those arrangements where the flaps are supported such that the movement between the retracted and extended positions is a combination of a pivotal and a translational pivotal movement rather than a simple pivotal movement as it is the case in the embodiment described here.

Furthermore, the first section of the actuation assembly in the left wing 1 comprises a shaft assembly formed of a plurality of shaft elements 47 rotatably supported in the left wing 1 and gear box elements 49. The shaft elements 47 and the gear box elements 49 connect the first output 21 of the drive unit 15 with the input elements 29, 41 of the inner and outer drive stations 25, 27 in the left wing 1. In this regard, the gear box elements 49 enable a change in the direction of adjacent shaft elements 47, and the shaft assembly allows for transmitting rotary power from the first output 21 to the input elements 29, 41 of the drive stations 25, 27.

Moreover, this configuration of shaft elements 47, gear box elements 49 and drive stations 25, 27 forms a connection between the drive unit 15 and the flaps 7, 9 which is sufficiently rigid to also transfer vibrations and in particular solid-borne sound from the drive unit 15 to the flaps 7, 9 the vibrations or sound being generated when the drive unit 15 is operated. Thus, in this embodiment the drive unit 15 is effective as excitation means for generating vibrations in a defined frequency interval. However, when elements in this drive train formed by the shaft elements 47, the gear box elements 49 and the drive stations 25, 27, fail or break, i.e. a shaft element 47 breaks or gear wheels in the gear box elements 49 or drive stations 25, 27 become disengaged or a drive strut 37 ruptures, this rigid connection no longer exists so that vibrations or sound cannot be transmitted with the same efficiency from the drive unit 15 to those flaps anymore to which the drive train is interrupted.

As shown in FIG. 2 the second section of the actuation assembly in the second or right wing 3 is configured symmetrically to the first section, namely it also comprises inner and outer drive stations 25, 27 configured in the same way as the inner and outer drive stations 25, 27 of the left wing 1. Further, the drive stations 25, 27 of the right wing 3 are also connected to the second output 23 of the drive unit 15 via a shaft assembly that comprises shaft elements 47 and gear box elements 49, and also in the right wing 3 the output elements 31, 43 of the drive stations 25, 27 are coupled to the connection elements on the flaps 7, 9 by means of strut elements 37, in the same way as shown in FIG. 3. Thus, also in the right wing 3 a rigid drive train is formed between the respective output of the drive unit 15 and the flaps 7, 9.

Furthermore, as shown in FIGS. 2 and 3 in this preferred embodiment the connection elements 39 on the flaps 7, 9 are provided with sensor elements 51 which are capable of providing a sensor signal which corresponds to the vibrations at the position of the sensor elements 51 on the connection element 39 and which includes the vibrations, in particular the solid-borne sound, generated by the excitation means. Thus, the sensor elements 51 detect vibrations of the respective flap element, in particular the connection element 39 and provide a signal which represents the vibrations in such a manner that the signal reflects the deflection or displacement as a function of time at the respective position so that the frequencies and amplitudes can be analysed. When the drive train between the drive unit 15 and a specific connection element 37 does not have any defects such as a broken shaft element 47 or drive strut 37 rupture etc., vibrations or sound generated with frequencies in the defined frequency interval during operation of the excitation means in the form of the drive unit 15 can effectively be detected by the sensor element 51 on the connection element. Instead, when there is a defect in this drive train, during operation of the drive unit 15 the amplitude of the vibrations in the frequency interval will be below a threshold, and this indicates that a failure occurred in the respective drive train.

The sensor elements 51 are connected to a central control unit 53 comprising a first and a second control computer 55, 57 via lines 59. These two computers 55, 57 are provided for safety reasons and both computers 55, 57 are capable of performing the same processes. In this regard it should be noted that each sensor element 51 may comprise first and second individual and independently working sensors wherein each of the first sensors is connected to the first computer 55 and each of the second sensors is connected to the second computer 57. In this way two independent systems of sensors and computers are created so that a high level of safety is achieved.

The control unit 53, i.e. the computers 55, 57, is provided with a software for controlling the adjustment of the flaps 7, 9, and the slats 13. Therefore, the control unit 53 is connected with the drive unit 15 via line 61. During operation of the control unit 53, when the excitation means in the form of the drive unit 15 is operating, also each of the sensor signals provided by the sensor elements 51 on the connection elements 39 is evaluated in such a manner that the amplitude of the signal for the defined frequency interval is compared with a threshold value defined for that sensor element 51 the signal of which is analysed. If during operation of the drive unit 15 and adjustment of the position of the flaps 7, 9 the amplitude in the predetermined frequency interval of the sensor signal of a sensor element 51 on a flap 7, 9 currently being adjusted is below its corresponding threshold, a failure signal is generated by the control unit 53. Here, the failure signal may also include information as to which sensor element 51 detects a signal with low amplitude so as to allow for determining in which part of the drive train the failure occurred. The fact that the amplitude is low, indicates that the drive train to that connection element 39 on the flap 7, 9 carrying the sensor element 51 providing the signal with the low amplitude is interrupted due to a failure such as a broken shaft element 47 or a mechanical defect in a gear box element 49 or the gear assembly 33, 45 in a drive station 25, 27.

Thus the following steps are carried out by the control unit 53:
- operating the excitation means in the form of the drive unit 15,
- detecting the sensor signals provided by the sensor elements 51 during operation of the excitation means,
- comparing for each sensor element 51 the amplitude in the defined frequency interval of the sensor signal of that sensor element 51 with a predetermined threshold of that sensor element 51, in particular analysing the frequency spectrum of each sensor element 51 and comparing for each sensor element 51 the amplitude of the defined frequency interval with a predetermined threshold of that sensor element 51, and
- providing a failure signal, when for at least one sensor signal the amplitude is below the predetermined threshold.

This method has the advantage that the sensor elements 51 on the flaps 7, 9 allow to more reliably detect a failure in the actuation assembly independent of the air loads on the flaps 7, 9.

Figure 4:
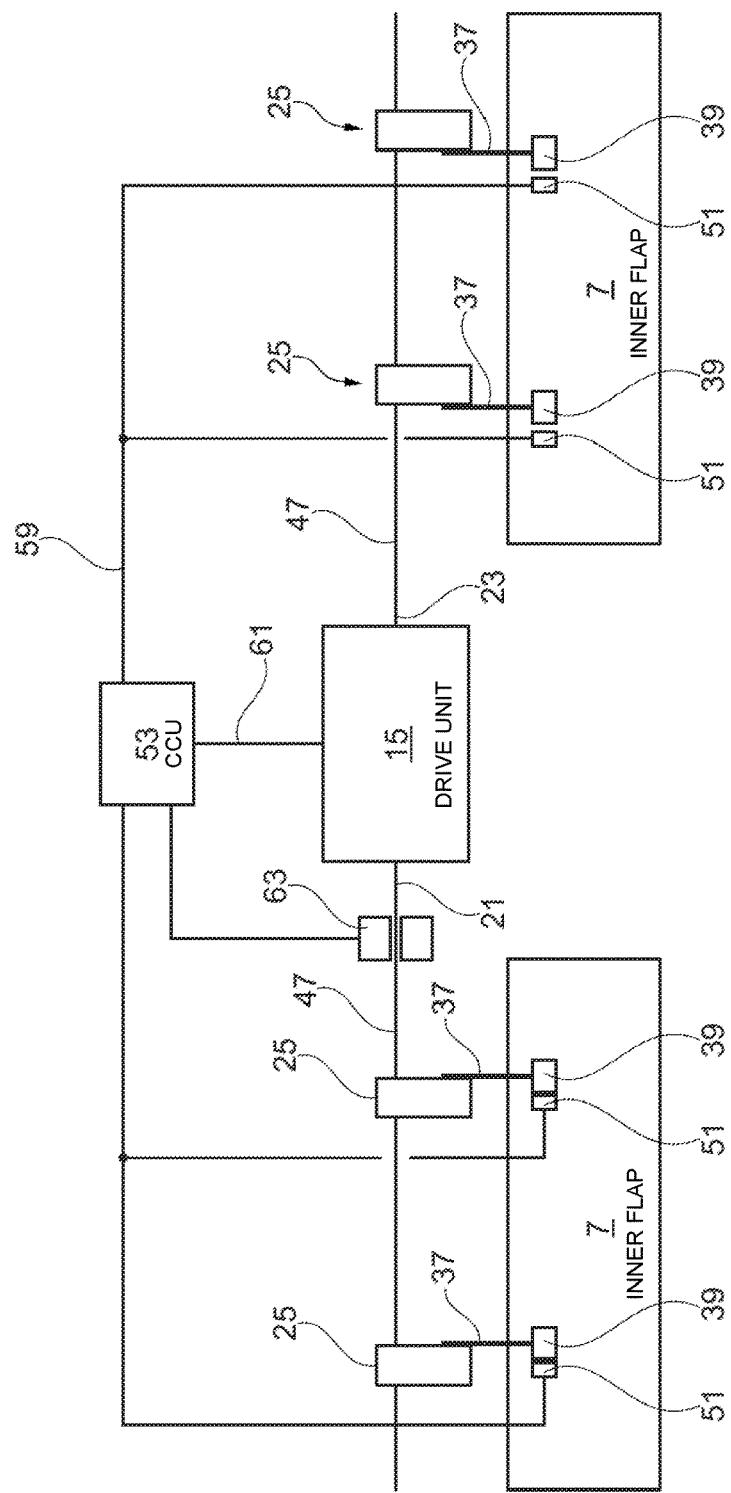
FIG. 4 is a schematic view of a further embodiment.

In FIG. 4 a further preferred embodiment of the present invention is schematically shown. In this embodiment the arrangement of the drive train and the flaps 7, 9 on the wing is similar to the first embodiment so that details are omitted here and only the inner flaps 7 are shown.

A drive unit 15 is provided which is capable of moving the flaps 7 between a retracted and an extended position via shaft elements 47, drive stations 25 having input and output elements and a strut element 37. At the connection elements 39 on the flaps 1 sensor elements 51 are arranged.

Furthermore, the output 21 of the drive unit 15 is coupled with an excitation drive 63 which is configured such that it induces vibrations or solid-borne sound of the output 21 in a defined frequency interval. During operation of the excitation drive 63 the sensor elements 51 detect the amplitude of vibrations having frequencies in the defined frequency interval, and if the amplitude detected by one of the sensor elements 51 is below the respective threshold, a failure signal will be generated as in case of the first embodiment. This will indicate that a failure occurred in the drive train between the output and the respective sensor element 51.

Thus, in this embodiment rather than employing the drive unit 15 for excitation of the vibrations in the drive train for moving the flaps 7, 9, a excitation means separate from the drive means are used for generating the solid-borne sound.

Both embodiments employ the concept that at the output of the drive unit vibrations or solid-borne sound is generated within a predetermined frequency interval and the amplitude to these vibrations or solid-borne will be detected so as to monitor the status of the drive train.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a fuselage;
   a first and a second wing extending away from the fuselage on opposite sides thereof;
   each wing being provided with at least one movable flap element arranged on the wing and being movable relative to the wing between a retracted position and an extended position;
   drive means having a movable driven output;
   an actuation assembly connecting, at an input thereof, the output of the drive means with, at an output thereof, each of the at least one flap element on the wings, the actuation assembly being configured such that a movement of the output of the drive means effects a movement of each of the at least one flap element between the extended and the retracted positions,
   wherein each of the flap elements is provided with a sensor element fixedly mounted on the flap element,
   wherein each sensor element is capable of providing a sensor signal which corresponds to the vibrations at the position of the sensor element on the flap element,
   excitation means coupled to the input of the actuation assembly and configured for generating solid-borne sound, the solid-borne sound being in a defined frequency interval and being transmitted from the excitation means to the flap elements via the actuation means; and
   a control unit connected with the excitation means and each sensor element,
   wherein the control unit is adapted
      to compare, for each sensor element, during operation of the excitation means the amplitude of the transmitted solid-borne sound in the defined frequency interval detected by that sensor element at the corresponding movable flap element with a predetermined threshold of that sensor element, and
      to provide a failure signal when for at least one sensor signal the amplitude is below the threshold of that at least one sensor signal.

2. The aircraft according to claim 1, wherein the excitation means are formed by the drive means, and
   wherein for each sensor element the amplitude of the solid-borne sound in the frequency interval is compared with the predetermined threshold during operation of the drive means.

3. The aircraft according to claim 1, wherein the excitation means are formed as an excitation drive which engages with the output of the drive means.

4. The aircraft according to claim 1, wherein the flap elements are pivotably mounted on the first and the second wing.

5. The aircraft according to claim 1, wherein each of the flap elements comprises a connection element fixedly coupled to the flap element,
   wherein the actuation assembly is connected to the connection element, and
   wherein the sensor element of each flap element is fixed to connection element on that flap element.

6. The aircraft according to claim 1, wherein the drive means comprise a drive unit arranged in the fuselage between the first and the second wing,
   wherein the drive unit comprises first and second rotatably driven outputs,
   wherein the actuation assembly comprises a first drive station and a first shaft assembly, the first drive station having a rotatable input element and an output element coupled to the input element in such a manner that rotation of the input element results in a rotation of the output element, wherein the first drive station is arranged on the first wing and the first shaft assembly connects the first output with the input element of the first drive station, wherein the output element of the first drive station is coupled with the at least one flap element on the first wing, wherein the actuation assembly comprises a second drive station and a second shaft assembly, the second drive station having a rotatable input element and an output element coupled to the input element in such a manner that rotation of the input element results in a rotation of the output element, wherein the second drive station is arranged on the second wing and the second shaft assembly connects the second output with the input element of the second drive station, wherein the output element of the second drive station is coupled with the at least one flap element on the second wing.

7. The aircraft according to claim 5, wherein the drive means comprise a drive unit arranged in the fuselage between the first and the second wing, wherein the drive unit comprises first and second rotatably driven outputs, wherein the actuation assembly comprises a first drive station and a first shaft assembly, the first drive station having a rotatable input element and an output element coupled to the input element in such a manner that rotation of the input element results in a rotation of the output element, wherein the first drive station is arranged on the first wing and the first shaft assembly connects the first output with the input element of the first drive station, wherein the output element of the first drive station is coupled with the at least one flap element on the first wing, wherein the actuation assembly comprises a second drive station and a second shaft assembly, the second drive station having a rotatable input element and an output element coupled to the input element in such a manner that rotation of the input element results in a rotation of the output element, wherein the second drive station is arranged on the second wing and the second shaft assembly connects the second output with the input element of the second drive station, wherein the output element of the second drive station is coupled with the at least one flap element on the second wing, wherein a first strut member connects the output element of first drive station and the connection element of the at least one flap element on the first wing, and wherein a second strut member connects the output element of second drive station and the connection element of the at least one flap element on the second wing.

8. The aircraft according to claim 6, wherein the first and second drive stations have a gear assembly coupling the input element and the output element wherein the gear assembly is configured such that when the input element is rotatably driven by the shaft assembly with a first rotational speed the output element rotates with a second rotational speed that is lower than the first rotational speed.

9. The aircraft according to claim 8, wherein the second rotational speed is lower than the first rotational speed by a factor larger than 300.

10. A method for actuating flap elements of an aircraft, the aircraft comprising a fuselage, first and second wings extending away from the fuselage on opposite sides thereof, each wing being provided with at least one movable flap element arranged on the wing and being movable relative to the wing between a retracted position and an extended position, drive means having a movable driven output, an actuation assembly connecting, at an input thereof, the output of the drive means with, at an output thereof, each of the at least one flap element on each wing, the actuation assembly being configured such that a movement of the output of the drive means effects a movement of each of the at least one flap element between the extended and the retracted positions, excitation means coupled to the input of the actuation assembly and configured for generating solid-borne sound, the solid-borne sound being in a defined frequency interval and being transmitted from the excitation means to the flap elements via the actuation means, wherein each of the flap elements is provided with a sensor element fixedly mounted on the corresponding flap elements, wherein each sensor element is capable of providing a sensor signal which corresponds to the solid-borne sound at the position of the sensor element on the flap element, and a control unit connected with the excitation means and each sensor element, the method comprising:
   operating the excitation means at the input of the actuation assembly;
   detecting the sensor signals provided by the sensor elements during operation of the excitation means;
   comparing, for each sensor element, the amplitude of the transmitted solid-borne sound in the defined frequency interval of the sensor signal of that sensor element at the corresponding movable flap element with a predetermined threshold of that sensor element; and
   providing a failure signal, when for at least one sensor signal the amplitude is below the predetermined threshold.

11. The method according to claim 10, wherein the excitation means are formed by the drive means, and wherein the sensor signals are detected during operation of the drive means.

* * * * *